United States Patent
Oyobe et al.

(10) Patent No.: US 9,302,668 B2
(45) Date of Patent: Apr. 5, 2016

(54) CONTROL DEVICE FOR VEHICLE

(75) Inventors: Hichirosai Oyobe, Nagoya (JP); Kenji Yamada, Komaki (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/390,843

(22) PCT Filed: Apr. 11, 2012

(86) PCT No.: PCT/JP2012/059896
§ 371 (c)(1),
(2), (4) Date: Oct. 6, 2014

(87) PCT Pub. No.: WO2013/153633
PCT Pub. Date: Oct. 17, 2013

(65) Prior Publication Data
US 2015/0120113 A1    Apr. 30, 2015

(51) Int. Cl.
*B60W 20/00* (2006.01)
*B60K 6/445* (2007.10)
*B60W 10/08* (2006.01)

(52) U.S. Cl.
CPC ............... *B60W 20/00* (2013.01); *B60K 6/445* (2013.01); *B60W 10/08* (2013.01); *B60Y 2400/301* (2013.01); *Y02T 10/6239* (2013.01)

(58) Field of Classification Search
CPC ...... B60K 6/445; B60W 10/08; B60W 20/00; B60Y 2400/301; Y02T 10/6239
See application file for complete search history.

(56) References Cited

U.S. PATENT DOCUMENTS

| | | | |
|---|---|---|---|
| 6,131,680 A | 10/2000 | Nii et al. | |
| 6,137,250 A | 10/2000 | Hirano et al. | |
| 2004/0061461 A1 | 4/2004 | Tajima et al. | |
| 2005/0104551 A1 | 5/2005 | Nishimura et al. | |
| 2008/0275611 A1* | 11/2008 | Snyder | B60K 6/365 |
| | | | 701/51 |
| 2010/0241297 A1 | 9/2010 | Aoki et al. | |

FOREIGN PATENT DOCUMENTS

| | | |
|---|---|---|
| JP | 9-308012 A | 11/1997 |
| JP | 11-041714 A | 2/1999 |
| JP | 2002-153096 A | 5/2002 |
| JP | 2002-325493 A | 11/2002 |
| JP | 2004-129359 A | 4/2004 |
| JP | 2004-266935 A | 9/2004 |
| JP | 2005-297780 A | 10/2005 |
| JP | 2006-152882 A | 6/2006 |
| JP | 2007-336707 A | 12/2007 |
| JP | 2009-126450 A | 6/2009 |

* cited by examiner

*Primary Examiner* — Mussa A Shaawat
*Assistant Examiner* — Yuen Wong
(74) *Attorney, Agent, or Firm* — Sughrue Mion, PLLC (57) ABSTRACT

A control device of the invention is applied for a hybrid vehicle comprising an internal combustion engine, a motor and a rotational position detector to detect a rotational position of a rotary shaft of the motor. The control device performs a procedure for obtaining an offset amount according to a request for obtaining the offset amount, which offset amount is a difference between a detected rotational position of the rotary shaft with the rotational position detector and an actual rotational position of the rotary shaft. The control device is configured to perform the procedure for obtaining the offset amount while the engine is running, when the vehicle stops and the control device determines that there is the request for obtaining the offset amount.

4 Claims, 7 Drawing Sheets

CONTROL DEVICE FOR VEHICLE

CROSS REFERENCE TO RELATED APPLICATIONS

This application is a National Stage of International Application No. PCT/JP2012/059896 filed Apr. 11, 2012, the contents of all of which are incorporated herein by reference in their entirety.

TECHNICAL FIELD

This invention relates to a control device for vehicle, which control device is applied to a vehicle that has a motor, an internal combustion engine and a rotational position detector to detect a rotational position of a rotary shaft of the motor.

BACKGROUND ART

Hybrid vehicles with one or more motors and an internal combustion engine as the drive source to generate driving force to run the vehicles are conventionally designed. In particular, the hybrid vehicle drives by the configuration of transmitting torque generated from one or both of the motor(s) and the engine toward a drive shaft connected with drive wheels of the vehicle. The hybrid vehicle is simply hereinafter referred to as "vehicle" for the sake of convenience.

On this kind of motor, the rotational position of the rotary shaft is detected with a rotational position detector (e.g., A resolver that enables the detection of the rotational position of the rotary shaft based on voltage excited due to electromagnetic induction between a rotator and a stator) in order to control the amount of torque generated on the rotary shaft and the rotational speed of the rotary shaft so as to be appropriate values according to operational statuses of the vehicle. However, the rotational position of the rotary shaft "detected" with the rotational position detector does not necessarily match the "actual" rotational position of the rotary shaft in general, due to variations in mounting position of the motor and the rotational position detector on the vehicle and manufacturing variations of the motor and the rotational position detector themselves.

For this reason, the motor is operated while considering the difference between the rotational position of the rotary shaft detected by the rotational position detector and the actual rotational position thereof (hereinafter referred to as "offset amount") on the vehicle with this kind of motor.

One of conventional control devices for vehicles (hereinafter referred to as "conventional device"), for example, is applied to a vehicle that has a transmission integrally composed of a motor and a rotational position detector (resolver), and stores an offset amount in a storage device installed in the transmission, which offset amount was obtained in advance (for example, see the patent literature 1). The conventional device then operates the motor in consideration of the obtained offset amount. As described above, an offset amount of the rotational position detector has been desired to be recognized to operate the motor properly.

CITATION LIST

Patent Literature 1: JP2005-276169A

SUMMARY OF INVENTION

1. Technical Problem

In cases where a failure of a member (e.g., the motor or the rotational position detector) having an impact on offset amount occurs, the member may be replaced or repaired. In this case, an offset amount before the member having the impact thereon is replaced or repaired does not necessarily match to an offset amount after the member is replaced or repaired due to the variations described above. It is hence desirable in this case that the updated offset amount after the replacement or the repair of the member having an impact thereon is obtained again.

For example, regarding a vehicle employing the conventional device, the transmission is dismounted from the vehicle in the case that a failure of the motor occurs. Next, when the motor is replaced or repaired, the updated offset amount of the rotational position detector is obtained by a predetermined method (in particular, a method to obtain an offset amount based on an excited voltage occurred in the motor when applying an external force to rotate the rotary shaft of the motor) "before" the transmission is mounted on the vehicle. Then, the obtained offset amount is stored in the storage device. After that, the transmission is mounted in the vehicle.

The method employed in the conventional device has the merit of preventing the vehicle from running without obtaining the updated offset amount since the offset amount was obtained at the time of mounting the new motor (transmission) on the vehicle. However, the above method has the demerit of requiring complicate processes to conduct the method since the method needs special devices (e.g., a device to apply the external force to rotate the rotary shaft of the motor, and a device to detect the excited voltage occurred in the motor) and the method needs to be conducted at a specific place (e.g., at an automobile repair shop) by a specific engineer.

In view of the above, in the case that the member having an impact on offset amount is replaced or repaired, a procedure for obtaining offset amount can be performed "after" mounting the member on the vehicle along with normal operations of general users of the vehicle (e.g., an operation of turning on a switch to activate the vehicle). However, when performing the procedure for obtaining offset amount, specific instruction signals (e.g., an instruction value in voltage to generate a specific rotating magnetic field around the rotor of the motor) are generally sent to the motor. Then, when the motor operates according to the instruction signal, some noise caused by the operation (hereinafter referred to as "noise during obtaining offset amount") may occur. For example, the noise during obtaining offset amount may occur due to vibrations of parts of the motor, which vibrations relates to the carrier frequency used in the PWM control (Pulse-Width Modulation control) to set voltage value according to the above instruction signal.

The noise during obtaining offset amount may cause an uncomfortable feeling on the user of the vehicle since the procedure for obtaining offset amount is generally operated regardless of the user's intention (that is, a control device in the vehicle operates the procedure without the user's instruction).

In view of the above technical problems, it is an object of the present invention to provide a control device for hybrid vehicle, which control device can obtain offset amount of a rotational position detector mounted on the hybrid vehicle without causing uncomfortable feeling on users of the vehicle as far as possible.

2. Solution to Problem

The control device of the present invention, for solving the above technical problem, is applied to a hybrid vehicle comprising an internal combustion engine, a motor and a rotational position detector to detect a rotational position of a rotary shaft of the motor.

The control device of the present invention comprises a configuration to perform a procedure for obtaining an offset amount according to a request for obtaining the offset amount, which offset amount is a difference between a detected rotational position of the rotary shaft with the rotational position detector and an actual rotational position of the rotary shaft.

Furthermore, the control device is configured to perform the procedure for obtaining the offset amount while the engine is running, when the vehicle stops in the case that the control device determines that there is the request for obtaining the offset amount.

In general, a running vehicle generates noise (so-called road noise) caused by its wheels contacting to land surface. Hence, the user of the vehicle is more likely to recognize the noise during obtaining offset amount when the vehicle stops compared with the case when the vehicle is running (in other words, when there is road noise), even if the magnitude of the noise during obtaining offset amount is the same.

In view of the above, the control device of the above configuration performs the procedure for obtaining the offset amount while the engine is running, when the vehicle stops in the case that the control device determines that there is the request for obtaining the offset amount. For example, if the engine does not run when determining that there is the request for obtaining the offset amount, the engine is started before performing the procedure for obtaining offset amount. As a result, the user of the vehicle is less likely to recognize the noise during obtaining offset amount compared with the case when the engine is not running, since the noise is transmitted to the user along with engine noise generated from the running engine (e.g., operating sounds of members constituting the engine). Thus, the control device prevents the noise during obtaining offset amount from being recognized by the user of the vehicle as far as possible, and consequently obtains the offset amount without causing uncomfortable feeling on the user of the vehicle as far as possible.

The "motor" may be a motor that can be applied to hybrid vehicles, and is not specifically limited in its type, structure and the number thereof mounted in the vehicle. The motor may have not only a function to output torque to run the vehicle but also a function to generate electric power (regenerate electric power) by using energy input from outside.

The "rotational position detector" may be a detector that can detect the rotational position of the rotary shaft (i.e., the angle of rotation when the rotary shaft rotates), and is not specifically limited in its structure and the number thereof installed in the vehicle. The rotational position can be detected as a degree of rotation of the rotary shaft (an absolute angle or a relative angle) with reference to a predetermined base position (e.g., the position where the angle of rotation is zero). Examples of the rotational position detector include a resolver.

The "offset amount" may be an amount (value) corresponding to the difference between a detected rotational position of the rotary shaft of the motor detected with the rotational position detector and an actual rotational position of the rotary shaft, and is not specifically limited in its particular parameter employed as the offset amount. Examples of the offset amount include the difference between degrees of rotation of a detected rotational position and an actual rotational position (e.g., the difference between absolute angles) and a parameter relating to the difference between degrees of rotation (e.g., a parameter that increases with increasing amount of the difference).

The "request for obtaining offset amount" may be a request supplied to the control device as needed, and is not specifically limited. For example, the request for obtaining offset amount may be supplied to the control device when the difference between the actual offset amount and the obtained offset amount in the control device (e.g., an offset amount stored in a memory if the control device has the memory) is more than a predetermined degree or when the degree is likely to be more than the predetermined degree. Furthermore, the request for obtaining offset amount may be supplied to the control device when a member having an impact on the offset amount (e.g., the motor and the rotational position detector) is replaced or repaired, when a predetermined time has passed since the present offset amount used to operate the motor was obtained (i.e., since the previous time of obtaining the offset amount), and when a condition to obtain the offset amount considering to operational statuses of the motor (e.g., the difference between a requested torque to the motor and an actually generated torque is equal to or more than a predetermined value) is satisfied.

In particular, when a member having an impact on the offset amount is replaced or repaired, examples of the method to supply the request for obtaining offset amount to the control device include one or both of a method in which an engineer who has carried out the replacement, etc., supplies the request for obtaining offset amount to the control device in accordance with a work procedure manual, and a method in which the control device itself recognizes the replacement, etc., by using a predetermined technique and then determines that there is the request when recognizing accordingly.

In addition, the "member having an impact on the offset amount" may be a member that has any impact on the offset amount, and is not specifically limited. Examples of the member having an impact on the offset amount include a motor, a rotational position detector, a member to fix the motor and the rotational position detector on a vehicle, a transaxle in which the motor, the rotational position detector and a gearing system are stored, and a part of the control device which part stores the offset amount.

The "procedure for obtaining the offset amount" may be a procedure that can obtain the offset amount of the rotational position detector, and is not specifically limited in its specific process, conditions to perform the procedure and required accuracy for obtaining the offset amount. Examples of the procedure for obtaining the offset amount, in the case that a resolver is employed as the rotational position detector, include a procedure where the offset amount is obtained based on the d-axis voltage when the d-axis current and the q-axis current in the magnetic polar coordinate system (the d-q coordinate system) of the motor are zero (for example, please see JP 2004-266935), and a procedure where the offset amount is obtained based on the value of the q-axis current while generating a predetermined detective magnetic field around the rotor of the motor generator at rest.

In addition, the procedure for setting a reference position for the rotational position (e.g., a position at which the rotational position is assumed to be zero) in consideration of the obtained offset amount is hereinafter referred to as "origin point correction".

The control device of the present invention is not specifically limited in the configuration of the hybrid vehicle to which the control device is applied. For example, as a specific embodiment, the control device of the present invention may be applied to the hybrid vehicle comprising:

a first motor having a rotary shaft connected to an output shaft of the engine and is rotatable even when the vehicle stops, and a second motor having a rotary shaft connected to a drive shaft of the vehicle and is non-rotatable when the vehicle stops, as the motor; and a first rotational position detector to detect a rotational position of the rotary shaft of the first motor, and a second rotational position detector to detect a rotational position of the rotary shaft of the second motor, as the rotational position detector.

In the case that the control device of the present invention is applied to the above hybrid vehicle, the control device may be configured:

to perform a procedure for obtaining a first offset amount according to a request for obtaining the first offset amount, which first offset amount is a difference between a detected rotational position of the rotary shaft of the first motor with the first rotational position detector and an actual rotational position of the rotary shaft, and to perform a procedure for obtaining a second offset amount according to a request for obtaining the second offset amount, which second offset amount is a difference between a detected rotational position of the rotary shaft of the second motor with the second rotational position detector and an actual rotational position of the rotary shaft.

Furthermore, in the above case, the control device may be configured:

to perform, when the vehicle stops in the case that the control device determines that there is the request for obtaining first offset amount, the procedure for obtaining the first offset amount while the rotary shaft of the first motor is rotating along with a rotation of the output shaft of the running engine; and to perform, when the vehicle stops in the case that the control device determines that there is the request for obtaining second offset amount, the procedure for obtaining the second offset amount while the engine is running.

The control device of the above configuration performs the procedure for obtaining first offset amount and the procedure for obtaining second offset amount while the engine is running, and consequently the control device can obtain the first offset amount and the second offset amount without causing uncomfortable feeling on the user of the vehicle as far as possible.

Furthermore, the procedure for obtaining offset amount generally includes a step to obtain information about the rotational position of the rotary shaft of the motor and a step to specify the offset amount based on the obtained information. In general, information obtained while the rotary shaft of the motor is rotating is superior in terms of accuracy compared with that obtained while the rotary shaft of the motor is not rotating. In other words, an offset amount obtained while the rotary shaft of the motor is rotating is superior in terms of accuracy compared with that obtained while the rotary shaft of the motor is not rotating.

In view of the above, in the control device of the above embodiment, the offset amount (first offset amount), which relates to the first motor having the rotary shaft that is rotatable when the vehicle stops, is obtained while the rotary shaft is rotating. On the other hand, the offset amount (second offset amount), which relates to the second motor having the rotary shaft that is non-rotatable when the vehicle stops, is obtained while the rotary shaft is not rotating. Hence, the control device can obtain the first offset amount and the second offset amount accurately as far as possible in the vehicle having the above configuration.

On the other hand, in the control device of the above embodiment, the order of the procedure for obtaining first offset amount and the procedure for obtaining second offset amount is not specifically limited. In other words, the procedure for obtaining first offset amount and the procedure for obtaining second offset amount may be performed in this order, the procedure for obtaining first offset amount may be performed after the procedure for obtaining second offset amount, and the procedures may be concurrently performed.

For example, as a specific embodiment, the control device of the present invention may be configured to perform the procedure for obtaining the first offset amount and the procedure for obtaining the second offset amount in this order, when the control device determines that there is both of the request for obtaining the first offset amount and the request for obtaining the second offset amount.

As described above, the motor installed on the hybrid vehicle is controlled so that its torque on the rotary shaft and its rotational speed of the rotary shaft match to predetermined target values in consideration of the offset amount. Hence, if the motor is operated without using appropriate offset amount, the motor is not controlled properly and then the performance of the motor do not as good as the original performance.

In view of the above, as a specific embodiment, the control device of the present invention may be configured to prohibit the vehicle to run until the offset amount is obtained by performing the procedure for obtaining the offset amount, when the control device determines that there is the request for the obtaining offset amount.

In particular, as a specific embodiment, the control device of the present invention may be configured:

to prohibit the vehicle to run until the first offset amount is obtained by performing the procedure for obtaining the first offset amount, when the control device determines that there is the request for obtaining the first offset amount; and to prohibit the vehicle to run until the second offset amount is obtained by performing the procedure for obtaining the second offset amount, when the control device determines that there is the request for obtaining the second offset amount.

As a result of the above configuration, the control device can run the hybrid vehicle with appropriate offset amounts as far as possible.

As explained above with the several embodiments, the control device of the present invention has the effect that it can obtain offset amount(s) of rotational position detector(s) mounted on a hybrid vehicle without causing uncomfortable feeling on users of the vehicle as far as possible.

DESCRIPTION OF EMBODIMENTS

Hereinafter, embodiments of the control device of the present invention (the first embodiment to the fourth embodiment) will be described by referring to the drawings.

1. First Embodiment

<Outline of Device>

Figure 1:
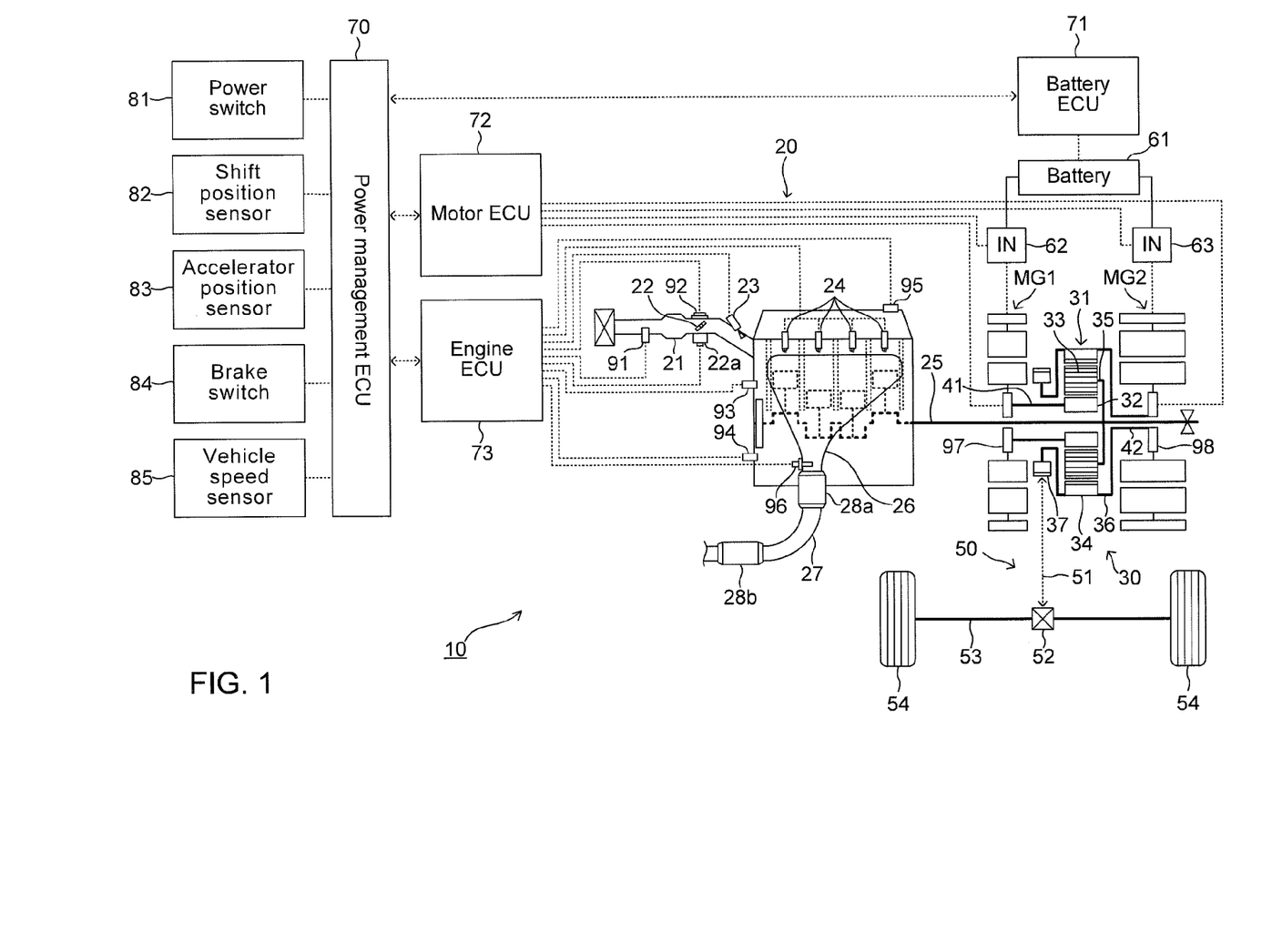
FIG. 1 is a schematic diagram of a vehicle to which a control device according to the first embodiment of the invention is applied.

FIG. 1 illustrates a schematic configuration of a system in which the control device according to the first embodiment of the present invention (hereinafter referred to as "first device") is applied to a hybrid vehicle 10. The hybrid vehicle 10 is hereinafter simply referred to as "vehicle 10" for the sake of convenience.

The vehicle 10 has, as illustrated in FIG. 1, a motor generator MG1, a motor generator MG2, an internal combustion engine 20 (hereinafter simply referred to as "engine 20"), a power distribution mechanism 50, a rotary shaft 41 of the motor generator MG1, a rotary shaft 42 of the motor generator MG2, a power transmission mechanism 50, a drive shaft 53 of the vehicle 10, a battery 61, a first inverter 62, a second inverter 63, a power management ECU 70, a battery ECU 71, a motor ECU 72, an engine ECU 73, and a plurality of sensors 81-85, 91-98 (including resolvers 97, 98). In addition, In addition, ECU stands for "electric control unit" and is an electric control circuit that has, as the main component, a microcomputer including a CPU, a ROM, a RAM, an interface, etc.

The motor generator MG1 is a synchronous motor generator that can work as the both of an electric generator and an electric motor. The motor generator MG1 is referred to as the first motor generator MG1 for the sake of convenience. The first motor generator MG1, in this embodiment, mainly serves as an electric generator. The first motor generator MG1 has a rotary shaft 41 (hereinafter referred to as "first shaft").

The motor generator MG2 is a synchronous motor generator that can work as the both of an electric generator and an electric motor, which is the same as the first motor generator MG1. The motor generator MG2 is referred to as the second motor generator MG2 for the sake of convenience. The second motor generator MG2, in this embodiment, mainly serves as an electric motor. The second motor generator MG2 has a rotary shaft 42 (hereinafter referred to as "second shaft").

The second motor generator MG2 has a rotor connected to the rotary shaft 42 and a stator. The second motor generator MG2 is configured to output torque on the rotary shaft 42 (i.e., generate force in the direction to rotate the rotor) by the sequential application of electric current to circuits (winding wires) therein so as to sequentially generate magnetic fields in the direction where the rotor rotates with respect to the stator, which circuits correspond to each magnetic fields. In addition, the configuration of the first motor generator MG1 is the same as that of the second motor generator MG2 except that it outputs torque on the rotary shaft 41.

The engine 20 is a four-cycle spark-ignited multi-cylinder internal combustion engine. The engine 20 has an intake passage part 21 including an intake pipe and an intake manifold, a throttle valve 22, a throttle valve actuator 22a, a plurality of fuel injectors 23, a plurality of ignition devices 24 including ignition plugs, a crankshaft 25 which is the output shaft of the engine 20, an exhaust manifold 26, an exhaust pipe 27, and exhaust purification catalysts 28a, 28b.

The throttle valve 22 is rotatably supported on the intake passage part 21. The throttle valve actuator 22a is configured to rotate the throttle valve 22 in response to an instruction signal from the engine ECU 73 so as to change the cross-sectional area of the intake passage part 21.

Each of the plurality of fuel injectors 23 (note that single fuel injector 23 is illustrated in FIG. 1) is installed on the engine 20 so that the discharge hole thereof is exposed in each intake port connected to the combustion chamber. Each fuel injector 23 is configured to inject a predetermined amount of fuel into the intake port in response to an instruction signal from the engine ECU 73.

Each of ignition devices 24 is configured to generate ignition sparks in the combustion chamber belonging to each cylinder at specific ignition timings (time of ignition) in response to an instruction signal from the engine ECU 73.

The crankshaft 25 is connected to the power distribution mechanism 50 and enables the torque generated from the engine 20 to input to the power distribution mechanism 50.

The exhaust purification catalysts 28a, 28b is installed at a portion of the exhaust manifold 26 to which portion the exhaust gas is to be collected and the exhaust pipe 27 lay downstream of the exhaust manifold 26. The exhaust purification catalysts 28a, 28b are configured to purify unburned matters (e.g., HC and CO) and nitrogen oxide (NOx) emitted from the engine 20.

The power distribution mechanism 50 has a well-known planetary gear mechanism 31. The planetary gear mechanism 31 has a sun gear 32, a plurality of planetary gears 33 and a ring gear 34.

The sun gear 32 is connected to the first shaft 41 of the first motor generator MG1. Hence, the first motor generator MG1 can output torque to the sun gear 32. To the contrary, the first motor generator MG1 can generate electricity when being rotationally-driven by a torque input from the sun gear 32 to the first motor generator MG1 (i.e., the first shaft 41).

The sun gear 32 engages to the planetary gears 33 (that is connected to the crank shaft 25 of the engine 20 via the planetary carrier 35). Furthermore, the sun gear 32 can rotate even when the ring gear 34 (that is connected to the drive shaft 53 of the vehicle 10 via a plurality of gears, as described below) does not rotate. As a result, the rotary shaft (first shaft) 41 of the first motor generator MG1 is connected to the output shaft (crank shaft 25) of the engine 20 and can rotate even when the vehicle 10 stops (that is, even when the drive shaft 53 does not rotate).

Each of the plurality of planetary gears 33 engages with the sun gear 32 and also engages with the ring gear 34. The rotary shaft (rotation axis) of the planetary gear 33 is fixed on a planetary carrier 35. The planetary carrier 35 is supported in the mechanism so as to be coaxially rotatable with the sun gear 32. The ring gear 34 is similarly supported in the mechanism so as to be coaxially rotatable with the sun gear 32. As a result, the rotating planetary gears 33 can revolve on the outer periphery of the sun gear 32. The planetary carrier 35 is connected to the crankshaft 25 of the engine 20. As a result, the planetary gears 33 can be rotationally-driven by a torque input from the crankshaft 25 to the planetary carrier 35.

Additionally, the planetary gear 33 engages with the sun gear 32 and the ring gear 34, as described above. As a result, when the planetary gears 33 input torque to the sun gear 32, the sun gear 32 is rotationally-driven by the torque. When the planetary gears 33 input torque to the ring gear 34, the ring gear 34 is rotationally-driven by the torque. To the contrary, when the sun gear 32 inputs torque to the planetary gears 33, the planetary gears 33 are rotationally-driven by the torque. When the ring gear 34 inputs torque to the planetary gears 33, the planetary gears 33 are rotationally-driven by the torque.

The ring gear 34 is connected to the second shaft 42 of the second motor generator MG2 via a ring gear carrier 36. Hence, the second motor generator MG2 can output torque to the ring gear 34. To the contrary, the second motor generator MG2 can generate electricity when being rotationally-driven by a torque input from the ring gear 34 to the second motor generator MG2 (i.e., the second shaft 42).

The ring gear 34 is connected to the drive shaft 53 via the plurality of gears described below (e.g., an output gear 37, a gear train 51 and a differential gear 52) so that the ring gear 34 substantially cannot rotate relative to the drive shaft 53 of the vehicle 10. This phrase "X substantially cannot rotate relative to Y" means that X cannot relatively rotate to Y except for looseness between the gears, etc. As a result, the rotary shaft (second shaft) 42 of the second motor generator MG2 is connected to the drive shaft 53 of the vehicle 10 and cannot rotate when the vehicle 10 stops (that is, when the drive shaft 53 does not rotate).

Additionally, the ring gear 34 is connected to the output gear 37 via the ring gear carrier 36. As a result, the output gear 37 can be rotationally-driven by a torque input from the ring gear 34 to the output gear 37. To the contrary, the ring gear 34 can be rotationally-driven by a torque input from the output gear 37 to the ring gear 34.

The power distribution mechanism 50 has the gear train 51, the differential gear 52 and the drive shaft 53.

The gear train 51 connects the output gear 37 and the differential gear 52 with gear mechanism to allow power transmission therebetween. The differential gear 52 is installed to the drive shaft 53. The drive wheels 54 are installed at the both ends of the drive shaft 53. As a result, the torque from the output gear 37 is transmitted to the drive wheels 54 via the gear train 51, the differential gear 52 and the drive shaft 53. The hybrid vehicle 10 can run by using this torque transmitted to the drive shaft 53.

The battery 61 is a chargeable/dischargeable secondary battery that supplies electric power to the first motor generator MG1 and the second motor generator MG2 to operate the motors or stores electric power generated at the first motor generator MG1 and the second motor generator MG2.

The battery 61 is electrically-connected to the first motor generator MG1 via the first inverter 62, the second motor generator MG2 via the second inverter 63, and the battery ECU 71. In other words, the battery 61 is connected to the first motor generator MG1, the second motor generator MG2 and the battery ECU 71 via always-connected energizing paths thereto.

The first motor generator MG1 is rotationally-driven by using the electric power supplied from the battery 61 via the first inverter 62. The second motor generator MG2 is rotationally-driven by using the electric power supplied from the battery 61 via the second inverter 63. To the contrary, when the first motor generator MG1 is generating electric power, the electric power generated by the first motor generator MG1 is supplied to the battery 61 via the first inverter 62. When the second motor generator MG2 is generating electric power, the electric power generated by the second motor generator MG2 is supplied to the battery 61 via the second inverter 63 in the same manner as the above.

In addition, the electric power generated by the first motor generator MG1 can be directly supplied to the second motor generator MG2, and the electric power generated by the second motor generator MG2 can be directly supplied to the first motor generator MG1.

The power management ECU 70 (hereinafter referred to as "PMECU 70") is connected to the battery ECU 71 and the motor ECU 72 so as to allow communications to exchange information with the battery ECU 71, the motor ECU 72 and the engine ECU 73. As a result, the information relating to the battery 61 is input to/output from the PMECU 70 through the battery ECU 71, the information relating to the inverters (62, 63) and the resolvers (97, 98) is input to/output from the PMECU 70 through the motor ECU 72, and the information relating to the sensors (91 to 96) is input to/output from the PMECU 70 through the engine ECU 73.

For example, the state of charge of the battery 61 is input to the PMECU 70, which value is calculated in the battery ECU 71. The state of charge is calculated based on an accumulated value of inflow/outflow current of the battery 61, etc., by using known methods.

Furthermore, a signal representing the rotational speed Nm1 of the first motor generator MG1 (hereinafter referred to as "MG1 rotational speed Nm1") and a signal representing the rotational speed Nm2 of the second motor generator MG2 (hereinafter referred to as "MG2 rotational speed Nm2") are input to the PMECU 70.

The motor ECU 72 calculates the MG1 rotational speed Nm1 based on "an output value of the resolver 97 that is installed on the first motor generator MG1 and outputs a value depending on the rotational position (angle of rotation) of the rotary shaft 41 of the first motor generator MG1". The motor ECU 72 similarly calculates the MG2 rotational speed Nm2 based on "an output value of the resolver 98 that is installed on the second motor generator MG2 and outputs a value depending on the rotational position (angle of rotation) of the rotary shaft 42 of the second motor generator MG2". In other words, a signal representing the rotational position (angle of rotation) of the first motor generator MG1 and a signal representing the rotational position (angle of rotation) of the second motor generator MG2 are input to the motor ECU 72.

Additionally, a various sort of output signals representing the engine status is input to the PMECU 70 through the engine ECU 73. The output signals representing the engine status includes output signals generated from an air flow meter 91, a throttle valve position sensor 92, a coolant water temperature sensor 93, an engine rotation speed sensor 94, a knocking sensor 95 and an air-fuel ratio sensor 96.

Furthermore, the PMECU 70 is connected to a power switch 81, a shift position sensor 82, an accelerator position sensor 83, a brake switch 84 and a vehicle speed sensor 85, and thus output signals generated from the sensors are input thereto.

The PMECU 70 sends instructions for controlling the battery 61 to the battery ECU 71, instructions for controlling the motor generators (MG1, MG2) to the motor ECU 72, and instructions for controlling the engine 20 to the engine ECU 73, based on the input information. Furthermore, the PMECU 70 stores and keeps parameters required for those instructions (e.g., the offset amounts of the resolvers 97, 98, and parameters relating to the control of the air-fuel ratio of the engine 20).

Furthermore, the motor ECU 72 sends instruction signals to the first inverter 62 and the second inverter 63 based on instructions from the PMECU 70. The motor ECU 72 thereby controls the first motor generator MG1 by using the first inverter 62 and also the second motor generator MG2 by using the second inverter 63.

Additionally, the engine ECU 73 controls the engine 20 by sending instruction signals to the throttle valve actuator 22a, the fuel injector 23 and the ignition device 24, etc., based on instructions from the PMECU 70.

The power switch 81 is a system start-up switch of the hybrid vehicle 10. The PMECU 70 determines the instruction to start-up the system when the power switch 81 is used (i.e., pushed) under the condition that a vehicle key is inserted into a key slot and a brake pedal is depressed, which components are not illustrated in the figure. After that, the PMECU 70 checks whether or not the vehicle 10 can run, and if the vehicle 10 can run (hereinafter referred to as "ready-on state") then the PMECU 70 shows information accordingly on a control panel (not illustrated in the figure), etc.

The shift position sensor 82 is configured to generate signals representing a shift position that is selected with a shift lever installed at a location adjacent to the driver's seat in the hybrid vehicle 10 to enable the driver to handle the shift lever, which lever is not illustrated in the figure. The shift positions include P (the parking position), R (the reverse position), N (the neutral position), D (the drive position) and B (the position where the engine brake is to be actively used).

The accelerator position sensor 83 is configured to generate output signals representing the degree of control of an accelerator pedal (accelerator control amount AP) that is installed to enable the driver to handle the accelerator pedal, which pedal is not illustrated in the figure.

The brake switch 84 is configured to generate output signals representing that the brake pedal is being used when the brake pedal is pushed, which pedal is installed to enable the driver to handle the brake pedal and is not illustrated in the figure.

The vehicle speed sensor 85 is configured to generate output signals representing the speed of the hybrid vehicle 10.

The air flow meter 91 is configured to measure the amount of air entered into the engine 20 per unit time and generate signals representing the amount of air (intake air amount).

The throttle valve position sensor 92 is configured to measure the opening degree of the throttle valve 22 (i.e., throttle valve position) and generate signals representing the measured throttle valve position.

The coolant water temperature sensor 93 is configured to measure the temperature of coolant water of the engine 20 and generate signals representing the measured temperature of the coolant water.

The engine rotation speed sensor 94 is configured to generate pulse signals with every predetermined angle rotation of the crankshaft 25 in the engine 20. The engine ECU 73 obtains the number of rotation of the crankshaft 25 per unit time (i.e., engine rotation speed) Ne based on the pulse signals.

The knocking sensor 95 is installed on the surface part of the engine 20. The knocking sensor 95 is configured to measure the vibration of the engine 20 and generate signals depending on the vibration. The engine ECU 73 obtains the knock intensity based on the signals.

The air-fuel ratio sensor 96 is installed at a location upstream of the exhaust purification catalyst 28a, which location is a portion of the exhaust manifold 26 to which portion the exhaust gas is to be collected. The air-fuel ratio sensor 96 is configured to measure the air-fuel ratio of exhaust gas and generate output signals depending on the air-fuel ratio measured on the exhaust gas (measured air-fuel ratio).

The resolver 97 is a rotational position detector to detect a rotational position of the rotary shaft 41 of the first motor generator MG1. The resolver 97 is installed on the rotary shaft 41 of the first motor generator MG1 so as not to allow the rotor of the resolver 97 to relatively rotate to the rotary shaft 41. As a result, the rotor of the resolver 97 rotates along with the rotation of the rotary shaft 41. The resolver 97 is configured to output signals depending on the rotational position of the rotary shaft 41. The motor ECU 72 obtains the rotational position of the rotary shaft 41 based on the signals. The motor ECU 72 also obtains the rotational speed Nm1 of the rotary shaft 41 based on the change of the signals per unit time.

The resolver 98 is a rotational position detector to detect rotational positions of the rotary shaft 42 of the second motor generator MG2. The resolver 98 is installed on the rotary shaft 42 of the second motor generator MG2 so as not to allow the rotor of the resolver 98 to relatively rotate to the rotary shaft 42. As a result, the rotor of the resolver 98 rotates along with the rotation of the rotary shaft 42. The resolver 98 is configured to output signals depending on the rotational position of the rotary shaft 42. The motor ECU 72 obtains the rotational position of the rotary shaft 42 based on the signals. The motor ECU 72 also obtains the rotational speed Nm2 of the rotary shaft 42 based on the change of the signals per unit time.

These are the schematic configuration of a system where the first device is applied to the hybrid vehicle 10.

<Concept of Performing Control>

Figure 2:
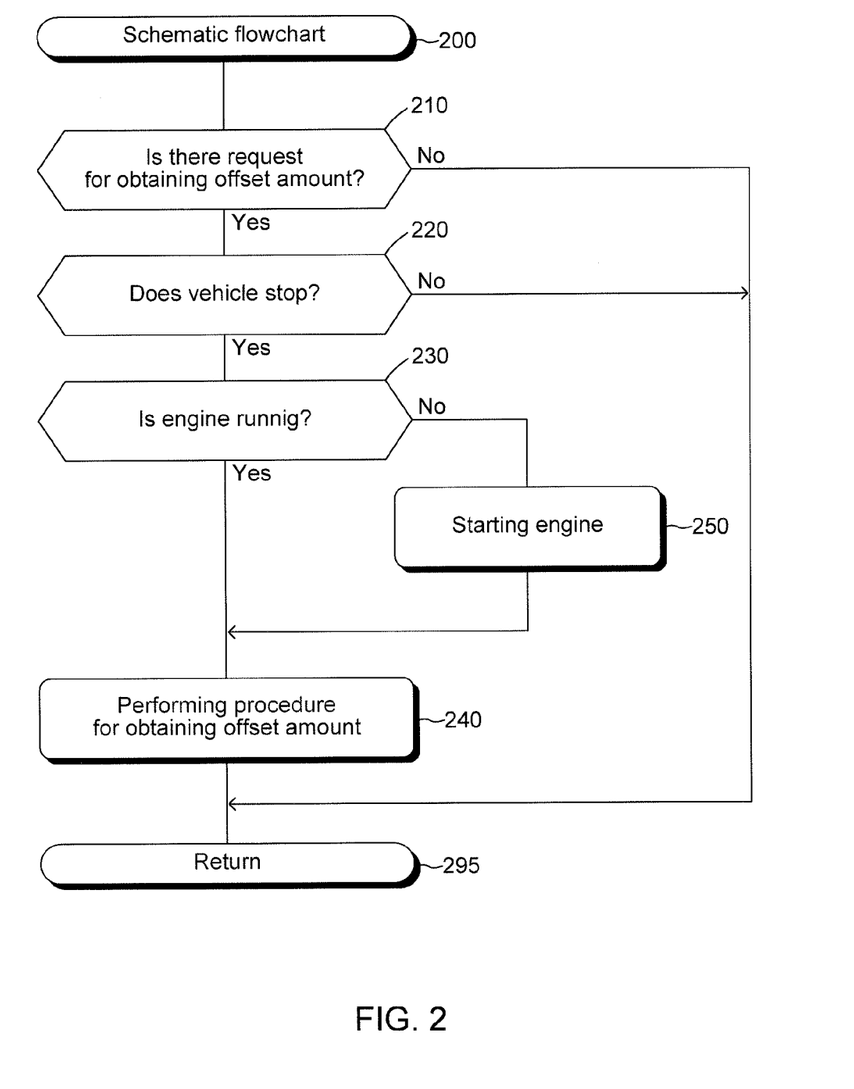
FIG. 2 is a schematic flowchart illustrating the way of the control executed by the control device according to the first embodiment of the invention.

Next, the concept of performing the control in the first device will be described by referring to FIG. 2. FIG. 2 is a "schematic flowchart" that illustrates the way of the control executed by the first device.

The first device determines, at step 210, whether or not there is a request for obtaining offset amount at this moment. For example, the first device determines that there is a request for obtaining offset amount, when a member having an impact on the offset amount (e.g., the resolvers 97, 98) is replaced or repaired, and an engineer provides the request for obtaining offset amount (instruction signal) to the first device, and furthermore the user pushes the power switch 81 for the first time after the request is provided to the first device and thereby the first device recognize the request.

The vehicle 10 has the first motor generator MG1, the second motor generator MG2, the resolver 97 and the resolver 98. Because of this configuration, the request for obtaining offset amount may occur separately for each of the resolver 97 and the resolver 98. In this explanation, however, the first device determines at step 210 that "there is the request for obtaining offset amount" when the request occurs for at least one of the resolver 97 and the resolver 98, for the sake of convenience in understanding the concept of performing control in the first device.

When the first device determines that there is the request for obtaining offset amount at this moment, the first device determines as "Yes" at step 210 to proceed to step 220.

At step 220, the first device determines whether or not the vehicle 10 stops at this moment. The first device makes this determination based on an output value of the vehicle speed sensor 85, etc. When the vehicle 10 stops at this moment, the first device determines as "Yes" at step 220 to proceed to step 230.

At step 230, the first device determines whether or not the engine 20 is running at this moment. The first device makes this determination based on an output value of the engine rotational speed sensor 94 (engine rotational speed Ne), etc. When the engine 20 is running at this moment, the first device determines as "Yes" at step 230 and proceeds to step 240 to perform a procedure for obtaining offset amount (note: a specific procedure is described below in detail). Thereby, the offset amount of the resolver (97, 98) is obtained. Furthermore, the first device stores the obtained offset amount in the PMECU 70 at step 240.

On the other hand, when the engine 20 is not running at this moment, the first device determines as "No" at step 230 and proceeds to step 250 to start the engine 20. After that, the first device proceeds to step 240 to perform the procedure for obtaining offset amount. As described above, the procedure for obtaining offset amount (step 240) is performed while the engine is running.

To the contrary, when there is not the request for obtaining offset amount or the vehicle 10 does not stop at this moment, the first device determines as "No" at step 210 or step 220. Then, the procedure for obtaining offset amount is not performed in these cases.

As described above, in the case that the engine 20 stops when the first device determines that there is a request for obtaining offset amount, the first device performs the procedure for obtaining offset amount while the engine 20 is running. Thus, the first device can prevent the noise during obtaining offset amount from being recognized by the user of the vehicle 10 as far as possible, and consequently the first device can obtain the offset amount without causing uncomfortable feeling on the user of the vehicle 10 as far as possible.

These are the explanations of the first device.

2. Second Device

Next, an embodiment to explain the hybrid vehicle of the present invention more specifically will be described below. The control device according to this embodiment is hereinafter referred to as "second device". The second device is applied to the same vehicle 10 as the first device.

<Concept of Performing Control>

The vehicle 10 has the resolver 97 to obtain the rotational position of the rotary shaft 41 of the first motor generator MG1 and the resolver 98 to obtain the rotational position of the rotary shaft 42 of the second motor generator MG2. Because of this configuration, the request for obtaining offset amount may occur separately for each of the offset amount of the resolver 97 (hereinafter referred to as "first offset amount") and the offset amount of the resolver 98 (hereinafter referred to as "second offset amount"). In view of this, the second device obtains one or both of the first offset amount and the second offset amount as needed.

<Actual Operation>

An actual operation of the second device will be described below.

In the second device, the CPU of the PMECU 70 (hereinafter referred to as "PM") executes the respective routines in FIG. 3 to FIG. 5 for obtaining offset amount at every predetermined time. Hereinafter, the respective routines performed in the PM will be described in detail.

Figure 3:
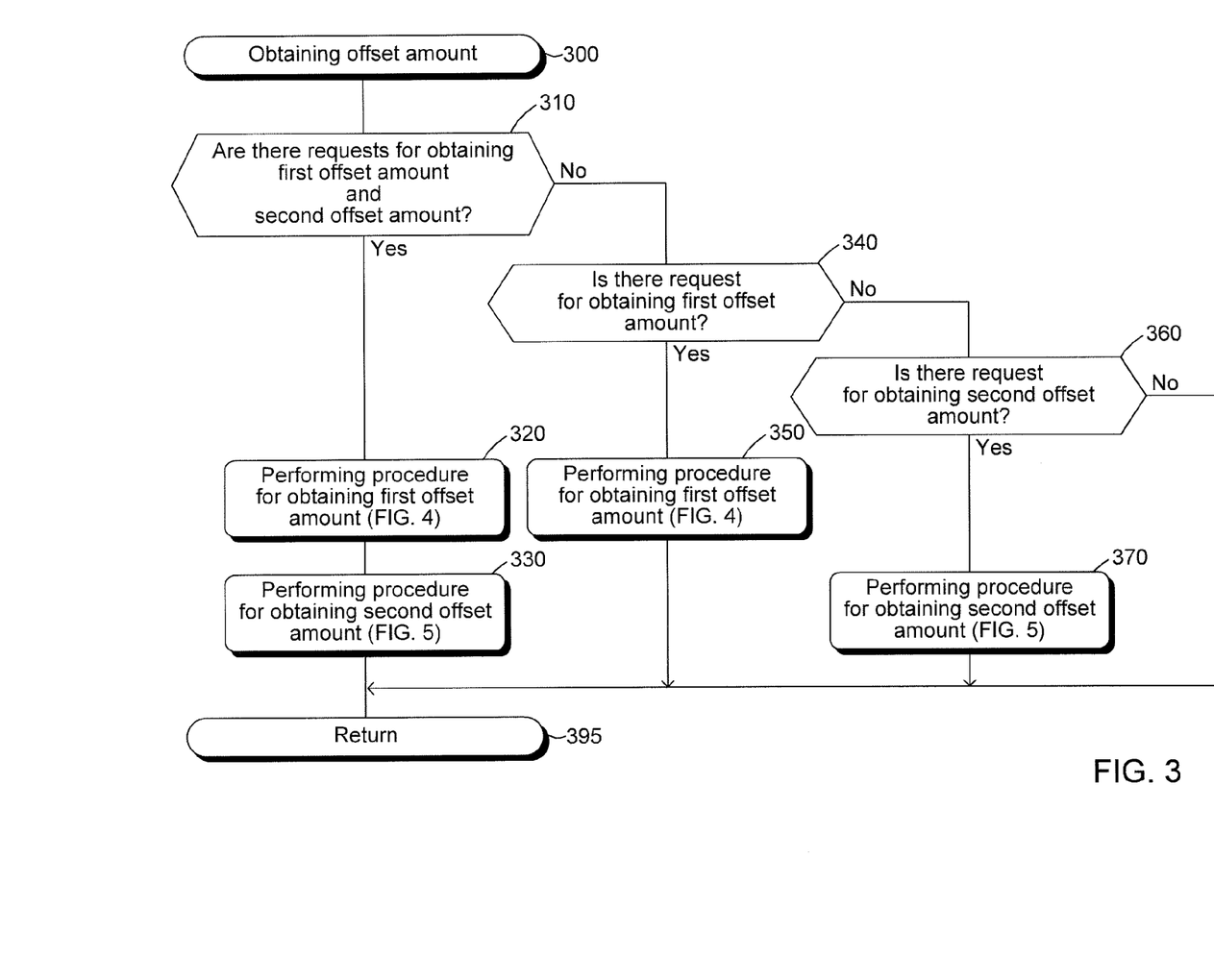
FIG. 3 is a flowchart illustrating a routine executed by a power management ECU in a control device according to the second embodiment of the invention.

The PM executes the "offset amount obtaining routine" indicated by the flowchart in FIG. 3 at every predetermined time (e.g., the power switch 81 is pushed and an instruction to start-up the system is sent to the PMECU 70). By this routine, the PM determines whether or not there is a request for obtaining one or both of the first offset amount and the second offset amount, and then the PM performs one or both of a procedure for obtaining the first offset amount (hereinafter referred to as "procedure for obtaining first offset amount") and a procedure for obtaining the second offset amount (hereinafter referred to as "procedure for obtaining second offset amount") based on the determination.

In particular, the PM starts a process at step 300 in FIG. 3 at a predetermined time and then proceeds to step 310. The PM determines, at step 310, whether or not there is (the both of) the request for obtaining first offset amount and the request for obtaining second offset amount. For example, these requests are provided by the engineer when the member having an impact on the offset amount (e.g., one or both of the resolvers 97, 98) is replaced or repaired, as same as the first device.

When there are the both of the request for obtaining first offset amount and the request for obtaining second offset amount at this moment, the PM determines as "Yes" at step 310 to proceed to step 320. At step 320, the PM obtains the first offset amount by executing the routine illustrated in FIG. 4.

Figure 4:
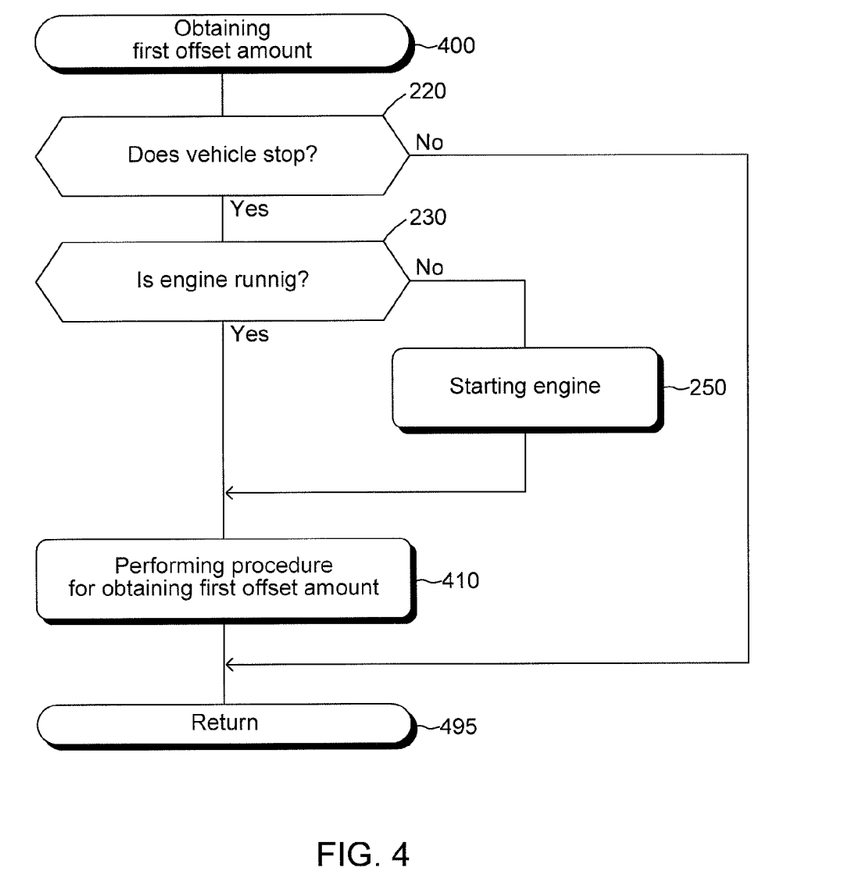
FIG. 4 is a flowchart illustrating a routine executed by the power management ECU in the control device according to the second embodiment of the invention.

In particular, when proceeding to step 320 of FIG. 3, the PM executes the "first offset amount obtaining routine" indicated by the flowchart in FIG. 4. By this routine, the PM performs the procedure for obtaining first offset amount while considering the status of the vehicle 10.

The routine in FIG. 4 is different from the routine in FIG. 2 only in that step 210 is deleted and step 410 is employed in place of step 240. The other steps in FIG. 4 for executing the same processing as those steps in FIG. 2 are attached with the same step-numbers as those steps in FIG. 2. Detailed description is thus omitted regarding these steps.

When the PM starts the process at step 400 in FIG. 4, the PM determines whether or not the vehicle 10 stops and whether or not the engine 20 is running at this moment at step 220 and step 230. When the vehicle 10 stops and the engine 20 is running at this moment, the PM proceeds to step 410 through step 220 and step 230. On the other hand, when the vehicle 10 stops but the engine 20 is not running, the PM proceeds to step 250 through step 220 and step 230, and then proceeds to step 410 after starting the engine 20.

The PM performs, at step 410, the procedure for obtaining first offset amount. As described above, the rotary shaft 41 of the first motor generator MG1 is connected to the crank shaft 25 (output shaft) of the engine 20 and can rotate even when the vehicle 10 stops (that is, even when the drive shaft 53 does not rotate).

Figure 6A:
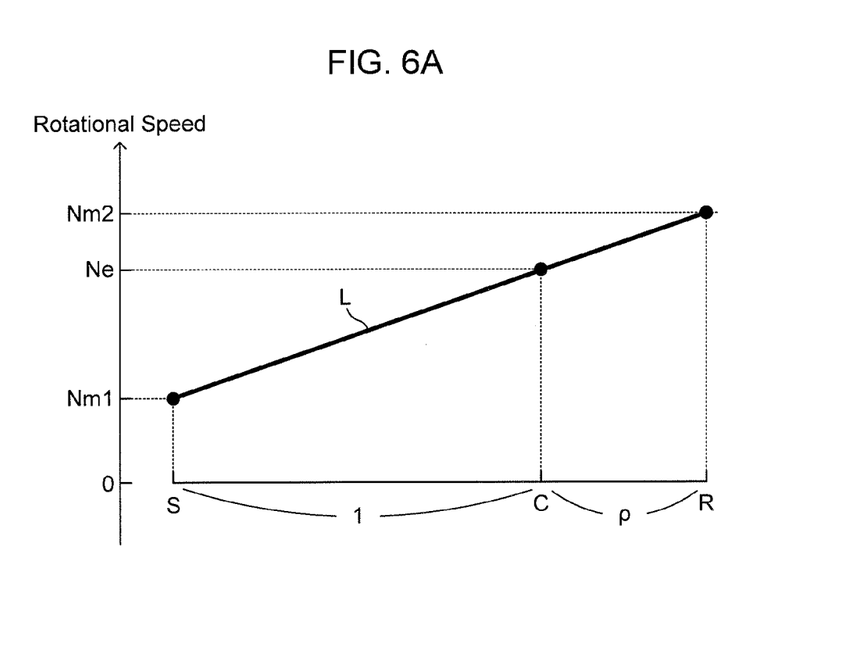
FIG. 6 is an alignment chart of a planetary gear train.
Figure 6B:
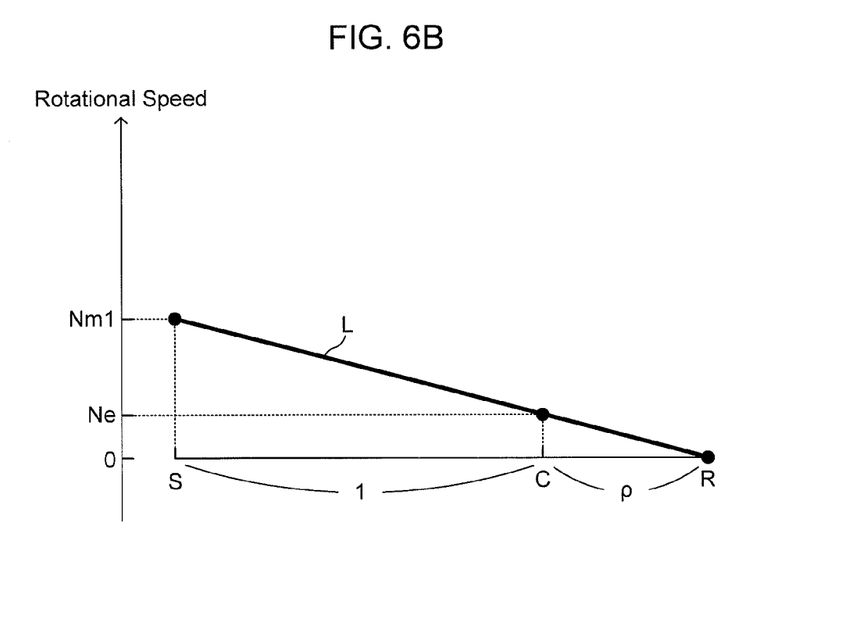

In particular, the alignment chart in FIG. 6 illustrates the relationship between rotational speeds of the rotary shafts of gears (the sun gear 32, the planetary gears 33 and the ring gear 34) in the planetary gear mechanism 31 to which the rotary shaft 41 of the first motor generator MG1. In brief, in FIG. 6A and FIG. 6B, the ordinate axis represents rotational speeds of the sun gear axis (S), the planetary carrier axis (C) and the ring gear axis (R), and the abscissa axis represents gear ratios of each gear (the p on the abscissa axis represents a ratio of teeth number of the sun gear 32 to that of the ring gear 34)

For example, referring to the example illustrated in FIG. 6A, when the crank shaft 25 of the engine 20 is rotating at a rotational speed of Ne (that is, the planetary carrier axis (C) connected to the crank shaft 25 is rotating at the rotational speed Ne) and the ring gear 34 is rotating at a rotational speed of Nm2, one point corresponding to the rotational speed Ne is defined regarding the planetary carrier axis (C) and the other point corresponding to the rotational speed Nm2 is defined regarding the ring gear axis (R). In this case, the sun gear axis rotates at a rotational speed of Nm1 that corresponds to the intersection point of the line (L) through the defined two points and the sun gear axis (S).

Next, referring to FIG. 6B, the rotational speeds of the three shaft when the vehicle 10 stops and the engine 20 is running as this embodiment are explained. When the vehicle 10 stops, the ring gear shaft (R), which is connected to the drive shaft 53 of the vehicle 10, does not rotate. Thus, the rotational speed of the ring gear shaft is zero. Then, a point corresponding to the rotational speed zero is defined regarding the ring gear axis (R). Furthermore, when the engine 20 is running as this embodiment, the planetary carrier shaft (C) rotates at a rotational speed of Ne corresponding to a rotational speed of the crank shaft 25. Then, a point corresponding to the rotational speed Ne is defined regarding the planetary carrier axis (C). In this case, the sun gear axis rotates at a rotational speed of Nm1 that corresponds to the intersection point of the line (L) through the defined two points and the sun gear axis (S). As explained above, the rotary shaft 41 (sun gear axis) of the first motor generator MG1 can rotate even when the vehicle 10 stops (that is, even when the rotational speed of the ring gear 34 is zero).

Furthermore, each magnitude of torque on the sun gear axis (S), the planetary carrier axis (C) and the ring gear axis (R) (each torque based on instructions from the PMECU 70 to the motor generators MG1, MG2, and torque based on instructions from the PMECU 70 to the engine 20) can be defined by considering equilibrium of torque on the alignment chart. In particular, for example, see patent literatures such as JP 2009-126450 A (US 2010/0241297) and JP 09-308012 A (U.S. Pat. No. 6,131,680 filed on Mar. 10, 1997). These literatures are incorporated herein by reference.

In addition, the mode to rotate the sun gear axis (S) along with the rotation of the planetary carrier axis (C) as illustrated in FIG. 6B substantially without generating torque on the sun gear axis (S) is referred to as "the mode to passively rotate the first motor generator MG1 (the rotary shaft 41, sun gear axis)".

Referring to FIG. 4 again, the PM performs the procedure for obtaining offset amount (the procedure for obtaining first offset amount), at step 410, while the rotary shaft 41 of the first motor generator MG1 is rotating along with the output shaft (the crank shaft 25) of the running engine 20 (in other words, while the first motor generator MG1 is passively rotated).

For example, the PM obtains the d-axis voltage, in the magnetic polar coordinate system (the d-q coordinate system) of the first motor generator MG1, while controlling the first motor generator MG1 so that the d-axis current and the q-axis current are zero (in other words, the output torque of the first motor generator MG1 is zero). In this instance, the angle between the horizontal axis (the d-axis) in the magnetic polar coordinate system (the d-q coordinate system) and the direction of the obtained d-axis voltage varies depending on the offset amount. In view of this fact, the PM obtains the first offset amount based on this angle (for example, please see JP 2004-266935). This procedure for obtaining offset amount is hereinafter referred to as "first procedure". In general, the first procedure has higher detection accuracy in offset amount compared with that of the second procedure described below. In addition, the PM may actually control signals to the first motor generator MG1 so that the angle becomes zero instead of obtaining the first offset amount itself.

After that, the PM proceeds to step 495 to end this routine once. The PM then backs to step 320 in FIG. 3 and proceeds to step 330. At step 330, the PM obtains the second offset amount by executing the routine illustrated in FIG. 5.

Figure 5:
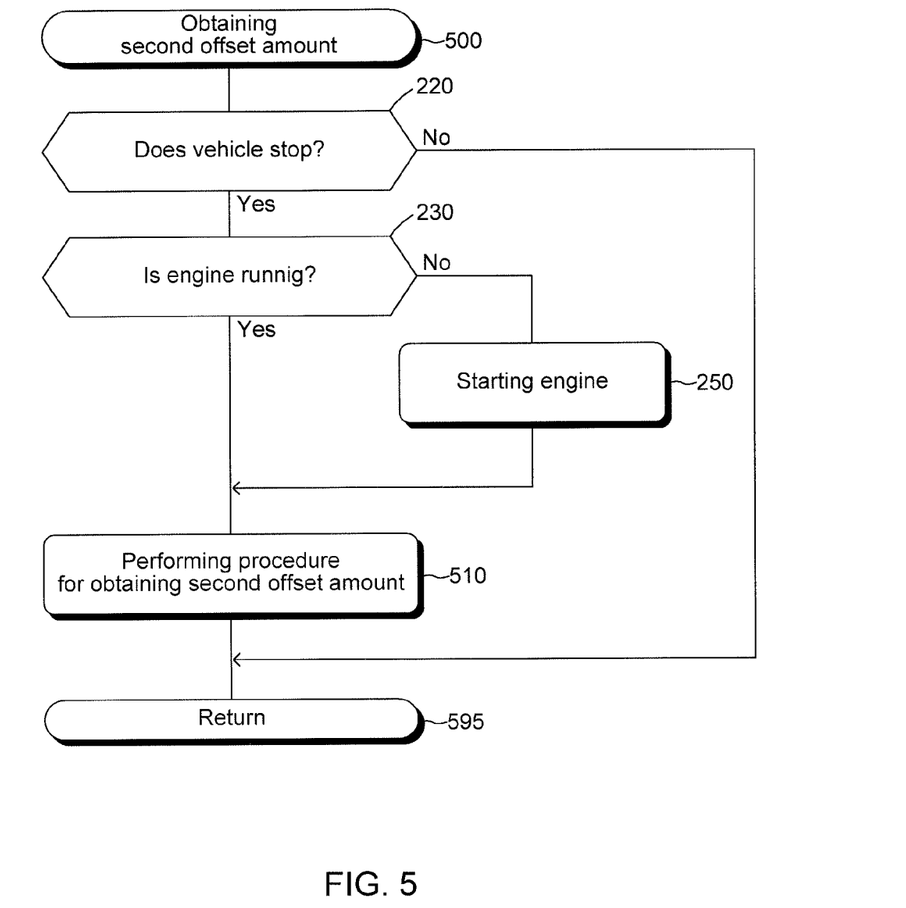
FIG. 5 is a flowchart illustrating a routine executed by the power management ECU in the control device according to the second embodiment of the invention.

In particular, when proceeding to step 330 of FIG. 3, the PM executes the "second offset amount obtaining routine" indicated by the flowchart in FIG. 5. By this routine, the PM performs the procedure for obtaining second offset amount while considering the status of the vehicle 10.

The routine in FIG. 5 is different from the routine in FIG. 2 only in that step 210 is deleted and step 510 is employed in place of step 240. The other steps in FIG. 5 for executing the same processing as those steps in FIG. 2 are attached with the same step-numbers as those steps in FIG. 2. Detailed description is thus omitted regarding these steps.

When the PM starts the process at step 500 in FIG. 5, the PM determines whether or not the vehicle 10 stops and whether or not the engine 20 is running at this moment at step 220 and step 230. When the vehicle 10 stops and the engine 20 is running at this moment, the PM proceeds to step 510 through step 220 and step 230. On the other hand, when the vehicle 10 stops but the engine 20 is not running, the PM proceeds to step 250 through step 220 and step 230, and then proceeds to step 510 after starting the engine 20.

The PM has already determined that the engine 20 is running in the routine in FIG. 4 (see step 230 and step 250 in FIG. 4) in this embodiment, and thus proceeds to step 510 to perform the procedure for obtaining second offset amount. As described above, the rotary shaft 42 of the second motor generator MG2 is connected to the drive shaft 53 of the vehicle 10 and cannot rotate when the vehicle 10 stops (that is, when the drive shaft 53 does not rotate). In view of this, at step 510, the PM performs a procedure for obtaining offset amount that is different from the procedure for obtaining first offset amount.

For example, the PM obtains the value of the q-axis current, in the magnetic polar coordinate system (the d-q coordinate system), while generating the predetermined detective magnetic field around the rotor of the second motor generator MG2 (for example, in the case that the rotational position of the rotor calculated from the output value of the resolver 98 is angle θr, while generating the magnetic field so that the direction of magnetic flux sequentially moves from angle θr−10 deg to angle θr+10 deg). After that, the PM specifies the angle θmin that corresponds to the detective magnetic field (the direction of magnetic flux thereof) where the absolute value of the amount of the q-axis current is the minimum value. In this instance, "the difference between the angle θmin and the angle θr" represents the second offset amount. In view of this fact, the PM obtains the second offset amount based on the difference. This procedure for obtaining offset amount is hereinafter referred to as "second procedure". In addition, the PM may actually control signals to the second motor generator MG2 so that the angle becomes zero instead of obtaining the second offset amount itself.

After that, the PM proceeds to step 595 to end this routine once. The PM then backs to step 330 in FIG. 3 and proceeds to step 395 to end this routine once.

As described above, in this embodiment, in the case that there are (the both of) the request for obtaining first offset amount and the request for obtaining second offset amount, the PM performs the procedure for obtaining first offset amount and the procedure for obtaining second offset amount in this order.

To the contrary, in the case that there is the request for obtaining first offset amount but there is not the request for obtaining second offset amount, the PM determines as "No" at step 310 to proceed to step 340. At step 340, the PM determines whether or not there is the request for obtaining first offset amount. In this case, the PM determines as "Yes" at step 340.

Next, the PM proceeds to step 350 to perform the procedure for obtaining first offset amount as same as step 320 (see FIG. 4). After that, the PM proceeds to step 395 to end this routine once.

As described above, in the case that there is the request for obtaining first offset amount but there is not the request for obtaining second offset amount, the PM performs only the procedure for obtaining first offset amount and does not perform the procedure for obtaining second offset amount.

On the other hand, in the case that there is not the request for obtaining first offset amount but there is the request for obtaining second offset amount, the PM determines as "No" at step 310 and step 340 to proceed to step 360. At step 360, the PM determines whether or not there is the request for obtaining second offset amount. In this case, the PM determines as "Yes" at step 360.

Next, the PM proceeds to step 370 to perform the procedure for obtaining second offset amount as same as step 330 (see FIG. 5). After that, the PM proceeds to step 395 to end this routine once.

As described above, in the case that there is not the request for obtaining first offset amount but there is the request for obtaining second offset amount, the PM performs only the procedure for obtaining second offset amount and does not perform the procedure for obtaining first offset amount.

In addition, in the case that there are neither the request for obtaining first offset amount nor the request for obtaining second offset amount, the PM determines as "No" at step 310, step 340 and step 360 in FIG. 3, and then proceeds to step 395 to end this routine once. In this case, the PM proceeds neither the procedure for obtaining first offset amount nor the procedure for obtaining second offset amount.

As described above, the second device obtains one or both of the first offset amount and the second offset amount as needed. In this instance, the procedure for obtaining first offset amount and the procedure for obtaining second offset amount are performed while the engine 20 is running, and consequently the second device can obtain the first offset amount and the second offset amount without causing uncomfortable feeling on the user of the vehicle 10 as far as possible. Furthermore, the first offset amount and the second offset amount are obtained through the appropriate procedures in consideration of the configuration of the vehicle 10 (the rotary shaft 41 of the first motor generator MG1, the rotary shaft 42 of the second motor generator MG2 and the rotation of each gear in the planetary gear mechanism 31), and consequently the second device can obtain the first offset amount and the second offset amount accurately as far as possible. These are the explanations of the second device.

3. Third Device

Next, the embodiment described below is a control device of the hybrid vehicle that allows or prohibits the vehicle 10 to run depending on the status whether or not the offset amount is obtained. The control device according to this embodiment is hereinafter referred to as "third device". The third device is applied to the same vehicle 10 as the first device.
<Concept of Performing Control>

As described above, if the motors (the first motor generator MG1 and the second motor generator MG2) are operated without using appropriate offset amounts (the first offset amount and the second offset amount), the performance of the motors do not as good as the original performance. In view of this, the third device prohibits the vehicle 10 to run until the appropriate offset amount is obtained.
<Actual Operation>

An actual operation of the third device will be described below.

Figure 7:
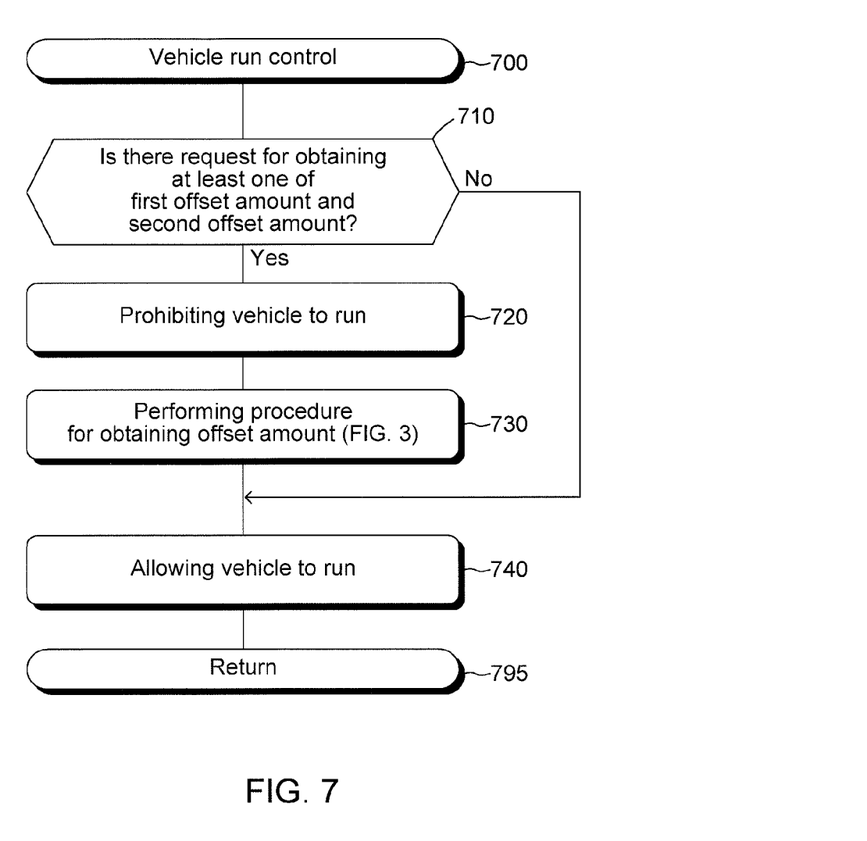
FIG. 7 is a flowchart illustrating a routine executed by a power management ECU in a control device according to the third embodiment of the invention.

In the third device, the PM executes the routine in FIG. 7 to control the vehicle and the routines in FIG. 3 to FIG. 5 for obtaining offset amount at every predetermined time. Hereinafter, the respective routines performed in the PM will be described in detail.

The PM executes the "vehicle run control routine" indicated by the flowchart in FIG. 7 at every predetermined time (e.g., the power switch 81 is pushed and an instruction to start-up the system is sent to the PMECU 70). By this routine, the PM determines whether or not there is a request for obtaining one or both of the first offset amount and the second offset amount, and then the PM prohibits the vehicle 10 to run until obtaining the first offset amount and the second offset amount.

In particular, the PM starts a process at step 700 in FIG. 7 at a predetermined time and then proceeds to step 710. The PM determines, at step 710, whether or not there is at least one of the request for obtaining first offset amount and the request for obtaining second offset amount. For example, these requests are provided by the engineer when the member having an impact on the offset amount (e.g., one or both of the resolvers 97, 98) is replaced or repaired, as same as the first device.

When there is at least one of the request for obtaining first offset amount and the request for obtaining second offset amount at this moment, the PM determines as "Yes" at step 710 to proceed to step 720. At step 720, the PM prohibits the vehicle 10 to run. For example, the PM does not shift the status of the vehicle 10 to the ready-on status (the status in which the vehicle 10 can run according to the use's instruction), even if the power switch 81 is pushed to start running the vehicle 10.

Next, the PM proceeds to step 730. At step 730, the PM executes the offset amount obtaining routine indicated by the flowchart in FIG. 3. Each step that the PM executes in the routine of FIG. 3 (and the routines of FIG. 5 and FIG. 6 executed in FIG. 3) is the same step as in the second device. Detailed description is thus omitted regarding step 730.

The PM executes the process in step 730 and then proceeds to step 740. At step 740, the PM allows the vehicle 10 to run. For example, the PM shifts the status of the vehicle 10 to the ready-on state. After that, the PM proceeds to step 795 to end this routine once.

As described above, in the case that there is the request for obtaining at least one of the first offset amount and the second offset amount, the PM prohibits the vehicle 10 to run until obtaining the offset amount(s).

In addition, in the case that there are neither the request for obtaining first offset amount nor the request for obtaining second offset amount, the PM determines as "No" at step 710, and then proceeds to step 740. At step 740, the PM allows the vehicle 10 to run and then proceeds to step 795 to end this routine once.

As described above, the third device prohibits the vehicle 10 to run until the offset amounts (the first offset amount and the second offset amount) are obtained by executing the procedures for obtaining offset amounts (the procedure for obtaining first offset amount and the procedure for obtaining second offset amount). As a result, the PM can run the hybrid vehicle with appropriate offset amounts as far as possible.

These are the explanations of the third device.

4. General Overview of Embodiments

As described referring to FIG. 1 to FIG. 7, the control device according to the embodiments of the present invention (the first device and the third device) is applied to a hybrid vehicle 10 comprising an internal combustion engine 20, a motor MG1, MG2 and a rotational position detector 97, 98 to detect a rotational position of a rotary shaft 41, 42 of the motor (see FIG. 1).

The control device of the above embodiment (the first device) performs a procedure for obtaining an offset amount according to a request for obtaining the offset amount, which offset amount is a difference between a detected rotational position of the rotary shaft 41, 42 with the rotational position detector 97, 98 and an actual rotational position of the rotary shaft 41, 42 (see step 420 in FIG. 2).

Furthermore, the control device of the above embodiment (the first device) performs the procedure for obtaining the offset amount while the engine 20 is running (see step 230 to step 250 in FIG. 2), when the vehicle 10 stops (when determining as "Yes" at step 220 in FIG. 2) in the case that the control device determines that there is the request for obtaining the offset amount (in the case that determining as "Yes" at step 210 in FIG. 2).

In particular, the hybrid vehicle 10 to which the control device of the above embodiment (the second device) comprises:

a first motor MG1 having a rotary shaft 41 connected to an output shaft 25 of the engine 20 and is rotatable even when the vehicle 10 stops, and a second motor MG2 having a rotary shaft 42 connected to a drive shaft 53 of the vehicle 10 and is non-rotatable when the vehicle 10 stops, as the motor (MG1, MG2); and a first rotational position detector 97 to detect a rotational position of the rotary shaft 41 of the first motor MG1, and a second rotational position detector 98 to detect a rotational position of the rotary shaft 42 of the second motor MG2, as the rotational position detector (97, 98).

The control device of the above embodiment (the second device) is configured:

to perform a procedure for obtaining a first offset amount according to a request for obtaining the first offset amount, which first offset amount is a difference between a detected rotational position of the rotary shaft 41 of the first motor MG1 with the first rotational position detector 97 and an actual rotational position of the rotary shaft 41 (see step 320 in FIG. 3, etc.), and to perform a procedure for obtaining a second offset amount according to a request for obtaining the second offset amount, which second offset amount is a difference between a detected rotational position of the rotary shaft 42 of the second motor MG2 with the second rotational position detector 98 and an actual rotational position of the rotary shaft 42 (see step 330 in FIG. 3, etc.).

Furthermore, the control device of the above embodiment (the second device) performs, when the vehicle 10 stops in the case that the control device determines that there is the request for obtaining first offset amount (when determining as "Yes" at step 220 in FIG. 4), the procedure for obtaining the first offset amount while the rotary shaft 41 of the first motor MG1 is rotating along with a rotation of the output shaft of the running engine 20 (see step 230, step 250 and step 410 in FIG. 4), and performs, when the vehicle 10 stops in the case that the control device determines there is the request for obtaining second offset amount (when determining as "Yes" at step 220 in FIG. 5), the procedure for obtaining the second offset amount while the engine 20 is running (see step 230, step 250 and step 510 in FIG. 5).

Furthermore, the control device of the above embodiment (the second device) is configured to perform the procedure for obtaining the first offset amount and the procedure for obtaining the second offset amount in this order (see step 320 and step 330 in FIG. 5), when the control device determines that there is both of the request for obtaining the first offset amount and the request for obtaining the second offset amount (when determining as "Yes" at step 310 in FIG. 3).

Additionally, the control device of the above embodiment (the third device) is configured to prohibit the vehicle 10 to run (see step 720 in FIG. 7) until the offset amount is obtained by performing the procedure for obtaining the offset amount (until finishing the process at step 730 in FIG. 7), when the control device determines that there is the request for the obtaining offset amount (when determining as "Yes" at step 710 in FIG. 7).

In particular, the control device of the above embodiment (the third device) is configured:

to prohibit the vehicle 10 to run until the first offset amount is obtained by performing the procedure for obtaining the first offset amount (the routine of FIG. 4 executed in the process at step 730), when the control device determines that there is the request for obtaining the first offset amount (when determining as "Yes" at step 710); and to prohibit the vehicle 10 to run until the second offset amount is obtained by performing the procedure for obtaining the second offset amount (the routine of FIG. 5 executed in the process at step 730), when the control device determines that there is the request for obtaining the second offset amount (when determining as "Yes" at step 710).

5. Other Embodiments

The present invention is not limited within the above specific embodiments, various modifications corrections may be made without departing from the scope of the invention.

For example, the second device performs the procedure for obtaining first offset amount and the procedure for obtaining second offset amount in this order, when preforming the both of the procedures. However, the order of the procedure for obtaining first offset amount and the procedure for obtaining second offset amount is not necessarily limited to the order in FIG. 3. For example, the procedure for obtaining first offset amount may be performed after the procedure for obtaining second offset amount, and the procedures may be concurrently performed.

Furthermore, for example, the vehicle 10, to which the control device of each embodiment (the first device and the third device) is applied, has two motors (the first motor generator MG1 and the second motor generator MG2). However, the control device of the present invention may be applied to a vehicle having one motor or a vehicle having three or more motors.

In addition, the PMECU 70, as the control device, is configured to store the offset amounts with regard to the control device of each embodiment (the first device and the second device). However, any combination of multiple ECUs including other ECUs (e.g., the motor ECU 72) may be regarded as the control device of the present invention, and the offset amounts may be stored in any ECU (e.g., the motor ECU 72) other than the PMECU 70.

Furthermore, the control devices in the above embodiments (the first device to the third device) employ the first procedure and the second procedure as examples of the procedure for obtaining offset amount. However, specific steps to realize the procedure for obtaining offset amount may be appropriate steps that are designed while considering conditions where the steps are performed and detection accuracy in the offset amount. In other words, procedures other than the first procedure and the second procedure may be employed.

As described above, the present invention is applicable as the control device that can obtain offset amount(s) of rotational position detector(s) mounted on a hybrid vehicle without causing uncomfortable feeling on users of the vehicle as far as possible.

The invention claimed is:

1. A vehicle run control device for a hybrid vehicle, the vehicle run control device comprising:
    an internal combustion engine;
    a first motor having a first rotary shaft connected to an output shaft of the internal combustion engine and being rotatable even upon the hybrid vehicle stopping;
    a second motor having a second rotary shaft connected to a drive shaft of the hybrid vehicle and being non-rotatable upon the hybrid vehicle stopping;

a first resolver to detect a rotational position of the rotary shaft of the first motor;

a second resolver to detect a rotational position of the second rotary shaft of the second motor, as the rotational position detector; and an electric control unit having control logic configured to cause the electric control unit to:

perform a procedure for obtaining a first offset amount according to a request for obtaining the first offset amount, the first offset amount being a difference between a detected rotational position of the first rotary shaft of the first motor with the first resolver and an actual rotational position of the rotary shaft, and perform a procedure for obtaining a second offset amount according to a request for obtaining the second offset amount, the second offset amount being a difference between a detected rotational position of the second rotary shaft of the second motor with the second resolver and an actual rotational position of the second rotary shaft, wherein the electric control unit being further configured to perform:

upon the hybrid vehicle stopping and the electric control unit determining there being the request for obtaining the first offset amount, obtaining the first offset amount while the first rotary shaft of the first motor being rotating along with a rotation of the output shaft of a running internal combustion engine; and upon the hybrid vehicle stopping and the electric control unit determining there being the request for obtaining the second offset amount, obtaining the second offset amount while the internal combustion engine is running; and allowing the hybrid vehicle to run in response to at least one of the obtaining the first offset amount and the second offset amount.

2. The control device according to claim 1, wherein the electric control unit being configured to perform the procedure for obtaining the first offset amount and the procedure for obtaining the second offset amount in this order, upon the electric control unit determining there being both of the request for obtaining the first offset amount and the request for obtaining the second offset amount.

3. The control device according to claim 2, wherein the electric control unit being configured to:

prohibit the hybrid vehicle to run until the first offset amount being obtained by performing the procedure for obtaining the first offset amount, upon the electric control unit determining there being the request for obtaining the first offset amount; and prohibit the hybrid vehicle to run until the second offset amount being obtained by performing the procedure for obtaining the second offset amount, upon the electric control unit determining there being the request for obtaining the second offset amount.

4. The control device according to claim 1, wherein the electric control unit being configured to:

prohibit the hybrid vehicle to run until the first offset amount being obtained by performing the procedure for obtaining the first offset amount, upon the electric control unit determining there being the request for obtaining the first offset amount; and prohibit the vehicle to run until the second offset amount being obtained by performing the procedure for obtaining the second offset amount, upon the electric control unit determining there being the request for obtaining the second offset amount.

* * * * *